United States Patent
Gannett

(10) Patent No.: US 7,901,763 B2
(45) Date of Patent: Mar. 8, 2011

(54) POROUS INFUSIBLE POLYMER PARTS

(75) Inventor: Thomas P. Gannett, Wilmington, DE (US)

(73) Assignee: E.I. du Pont de Nemours and Company, Wilmington, DE (US)

(*) Notice: Subject to any disclaimer, the term of this patent is extended or adjusted under 35 U.S.C. 154(b) by 294 days.

(21) Appl. No.: 12/004,437

(22) Filed: Dec. 19, 2007

(65) Prior Publication Data

US 2008/0152881 A1    Jun. 26, 2008

Related U.S. Application Data

(60) Provisional application No. 60/876,890, filed on Dec. 22, 2006.

(51) Int. Cl.
*B32B 3/26* (2006.01)
*C08J 9/26* (2006.01)

(52) U.S. Cl. .............. 428/314.2; 428/317.9; 521/61

(58) Field of Classification Search ........... 428/304.4, 428/317.9, 314.2; 521/61
See application file for complete search history.

(56) References Cited

U.S. PATENT DOCUMENTS

| | | | |
|---|---|---|---|
| 2,961,429 A * | 11/1960 | Anderson | 526/292.95 |
| 3,883,452 A * | 5/1975 | Scheuerlein et al. | 524/512 |
| 3,917,761 A | 11/1975 | Scheuerlein et al. | |
| 4,360,626 A | 11/1982 | Manwiller | |
| 4,642,117 A * | 2/1987 | Nguyen et al. | 623/23.72 |
| 4,780,097 A | 10/1988 | Piscitelli | |
| 5,444,097 A | 8/1995 | Tkacik | |
| 5,510,395 A * | 4/1996 | Tomioka et al. | 521/184 |
| 5,776,990 A | 7/1998 | Hedrick et al. | |
| 5,886,129 A | 3/1999 | DeColibus | |
| 6,372,808 B1 | 4/2002 | Kanada et al. | |
| 6,380,271 B1 | 4/2002 | Enoki et al. | |
| 7,303,811 B2 * | 12/2007 | Yao et al. | 428/315.7 |
| 2006/0039984 A1 | 2/2006 | Nakanishi et al. | |

FOREIGN PATENT DOCUMENTS

| | | |
|---|---|---|
| EP | 1 085 041 A1 | 3/2001 |
| JP | 63-278943 | 11/1988 |
| JP | 4-77533 | 3/1992 |
| JP | 04-077533 | 3/1992 |
| WO | WO 00/05297 | 2/2000 |

OTHER PUBLICATIONS

Charlier et al., "High Temperature Polymer Nanofoams Based on Amorphous, High Tg Polyimides", Polymer, vol. 36, No. 5, 1995, pp. 98-1002.

PCT International Search Report and Written Opinion for International Application No. PCT/US2007/026223 dated May 29, 2008.

Sasov et al., "Desktop X-ray microscopy and microtomography", Journal of Microscopy, vol. 191, Pt. 2, 1998, pp. 151-158.

Kim et al., "Porous Polyimide Films Prepared by Thermolysis of Porogens with Hyperbranched Structure", Journal of Applied Polymer Science, vol. 93, 2004, pp. 1711-1718.

* cited by examiner

Primary Examiner — Hai Vo

(57) ABSTRACT

Porous infusible polymer (IP) parts are made by incorporating 0.2 to 10 volume percent organic fibers, preferably with short lengths, into the particulate IP, consolidating the mixture under pressure and optionally heating, and then "burning off" the fibers. After the fibers are burned off the resulting part has porosity in which the pores are elongated, usually retaining the shape of the organic fibers. When these parts are exposed to moisture (which they usually absorb) and then suddenly heated they tend not to blister from vaporization of the water. This makes them useful as parts for aircraft (jet) and other engines and other applications where sudden temperature increase may occur.

5 Claims, 1 Drawing Sheet

POROUS INFUSIBLE POLYMER PARTS

CROSS-REFERENCE TO RELATED APPLICATION

This application claims the benefit of U.S. Provisional Application No. 60/876,890, filed Dec. 22, 2006, which is incorporated by reference herein in its entirety.

FIELD OF THE INVENTION

Porous infusible polymer parts which contain small controlled amounts of porosity, preferably where the pores are elongated, for example cylindrical, are better able to stand rapid heating without damage after imbibing moisture.

BACKGROUND OF THE INVENTION

Polymers are ubiquitous in current society, the most common types of polymers being used being thermosetting and thermoplastic polymers. However a third type of polymer is also used, the so-called infusible polymer (IP). These are polymers that are not crosslinked and so should theoretically be thermoplastic, but their melting and/or softening points are at a higher temperature than their decomposition temperature, so before liquefying as they are being heated, they decompose. Typically these types of polymers in commercial use have high decomposition temperatures, so their maximum use temperatures are usually quite high. Polymers of these types include, but are not limited to, polyimides, poly (p-phenylenes), and polymers composed mostly or all of repeat groups of the formula

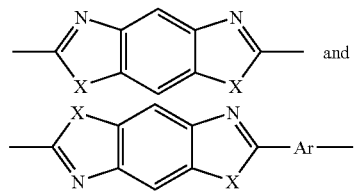

wherein X is NH, N-Phenyl, O (oxygen) or S (sulfur), and Ar is p-phenylene, 4,4'-biphenylene or 1,4-naphthylylene.

Since these IPs cannot be formed as typical thermoplastics, the polymers are often chemically formed, and the resulting polymer, if not already a powder, is ground to a powder. This powder is then subjected to pressure and optionally heat in a mold to consolidate the powder into a shaped part. Also, optionally, the shaped part can be then sintered to further consolidate the polymer. In many ways this type of shaping process is similar to that employed in the more familiar powdered metallurgy.

Most polymers, when exposed to moisture, either as liquid water or water vapor (in the air for instance), absorb some amount of water. If the polymer is then heated rapidly to well above the boiling point of water, the absorbed water will have a considerable vapor pressure and try to escape from the polymer. If the diffusion of the water from the polymer is slow, the internal pressure of the water may cause the formation of voids within the polymer (blistering), thereby reducing or destroying the usefulness of the polymer part. For instance, if the polymer is a part of a jet engine that stands at ambient temperature in a humid climate and/or in the rain, the part may absorb a considerable amount of water. When the engine is started, sections of the engine, including where such IP parts are located, may be heated rapidly, and as a result these parts may blister. Some method of avoiding such blistering while not substantially reducing the utility of the part would be desirable.

Porous and foamed polyimides are known; see for instance U.S. Pat. Nos. 5,444,097 and 4,780,097, U.S. Published Patent Application No. 2006/0039984, and D. W. Kim et al., J. Appl. Polym. Sci. 94:1711-18 (2004). In all these references, the pores are more or less spherical (either by measurement or photograph and/or by method of preparation), and in many cases the pores are a substantial volume of the total volume of the polymer plus pores.

Japanese Patent Application 04-077533A describes a porous material characterized by being made by consolidating a matrix which may be a "resin" which includes "polyimide resin" and "unidirectional" (parallel) carbon fibers which are removed from the composite electrolytic oxidation.

SUMMARY OF THE INVENTION

In one aspect, the present invention is a part comprising an infusible polymer, wherein said polymer comprises voids present in a range of from about 0.2 to about 10 volume percent, said voids being elongated, wherein a ratio of a longest dimension of said voids to a smallest dimension of said voids is at least 10:1.

In another aspect, the present invention is a process for the production of a part comprising an infusible polymer having elongated voids, the process comprising the steps:

(a) forming a mixture by mixing particles of an infusible polymer with 0.2 to 10 volume percent of a second polymer, wherein said volume percentage is based on the total volume of said infusible polymer and said second polymer, and said second polymer is in the form of elongated pieces wherein a ratio of a longest dimension of said pieces to a smallest dimension of said pieces is at least 10:1;

(b) subjecting said mixture to pressure to form a part; and (c) heating said part to a temperature to burn off said second polymer;

provided that said infusible polymer has a decomposition point above the temperature at which the second polymer is burned off.

DETAILED DESCRIPTION OF THE INVENTION

Figure 1:
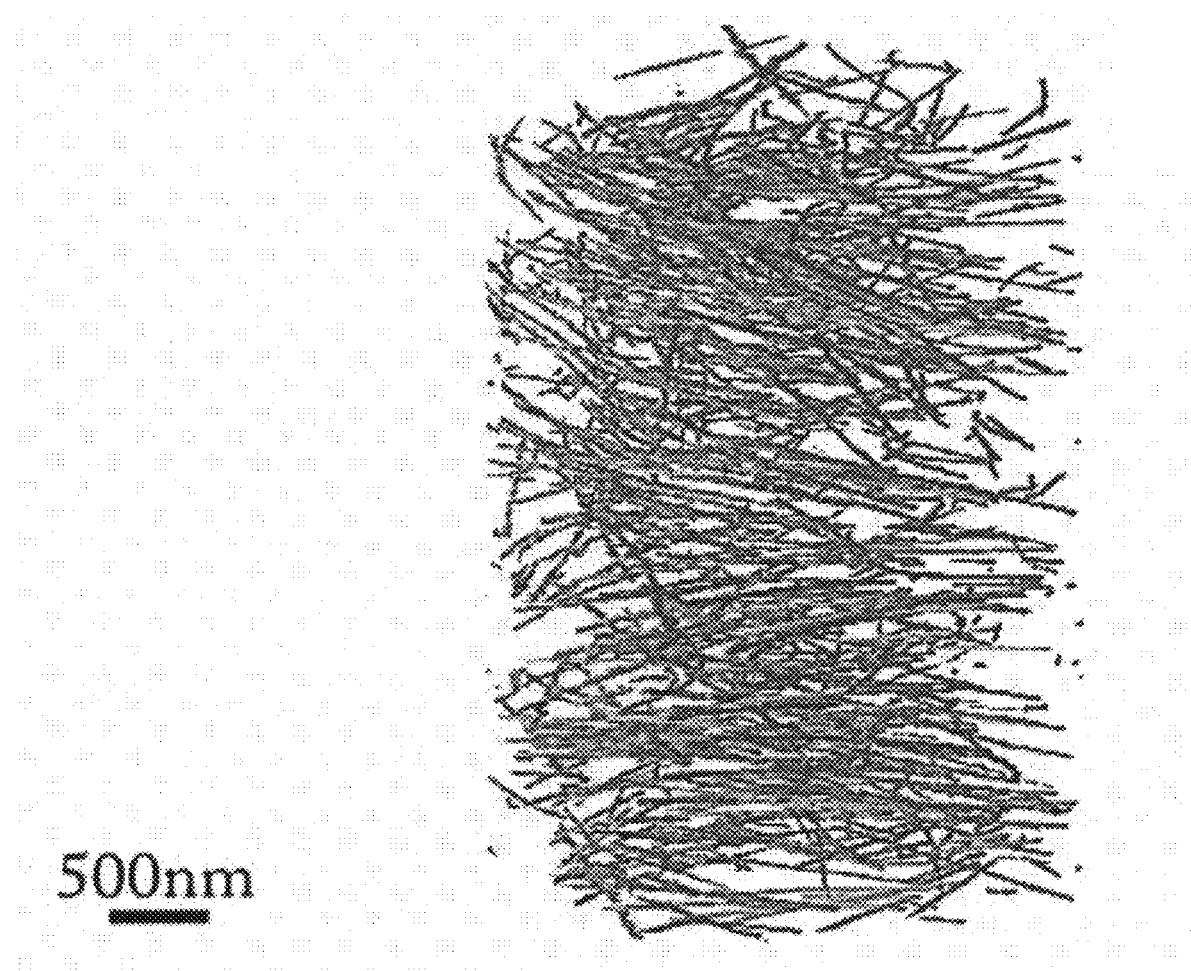
FIG. 1 shows a part made by the presently described process, more specifically an X-Ray tomograph showing the voids in the part (see Example 12).

Herein certain terms are used, and they are defined below:

The term "infusible polymer" or "IP" as used herein is a polymer that is essentially uncrosslinked but does not melt or soften enough to be melt processed—that is, processed in a molten or softened state—below its decomposition temperature. Useful types of IPs include polyimides, poly(p-phenylenes), and polymers composed mostly or all of repeat groups of the formula

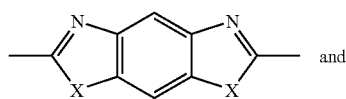

-continued

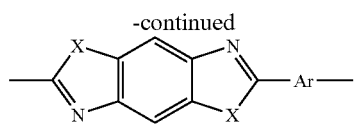

wherein X is NH, N-Phenyl, O (oxygen) or S (sulfur), and Ar is p-phenylene, 4,4'-biphenylene or 1,4-naphthylylene. Polyimides are preferred. Since it is often difficult or impossible to prove by test that IPs are not crosslinked, they will be considered for the purposes herein uncrosslinked if their indicated chemistry of formation is such that one would reasonably believe them, based on such chemistry, to be uncrosslinked.

By "burn off" is meant to remove all or substantially all polymer by heating, either in a chemically inert or chemically reactive atmosphere below the decomposition temperature of the IP. For example, when heated to a particular temperature, the second polymer (SP) may depolymerize or otherwise pyrolyze to its constituent monomers or other decomposition products. In a chemically reactive atmosphere such as air, the SP may be oxidized by the oxygen in the air to form volatile products such as water and/or carbon dioxide. In this context, "substantially all" means that not all of the second polymer is removed from the fusible polymer, but enough is removed that voids having the proper shape and "dimensions" are formed.

By "elongated" is meant that the ratio of the longest dimension of the item should be at least 10 times the shortest dimension, preferably the ratio should be at least 25, and more preferably at least 100. This holds for both voids and pieces of the SP. As referenced herein, the ratio is the average for such elongated voids, and does not include voids caused by incomplete consolidation of the IP. Since this ratio is determined by the fiber length and diameter, it is taken as that ratio for the fibers used in making the composition. If fibers are not used in making the composition, the void's average long and short dimensions shall be determined by X-Ray Tomography (see below).

By "volume percent voids" (porosity) is meant the volume occupied by the SP in the mixture of the IP and SP when forming the porous part, assuming both of these polymers are fully consolidated. This is a calculated number using the following calculation:

$$\% \text{Voids} = \frac{(\text{Wt. } SP/DenSP) \times 100}{[(\text{Wt. } SP/DenSP) + (\text{Wt. } IP/DenIP)]}$$

wherein Wt. is "weight of", and Den is "density of". If the IP powder already has other items incorporated into the powder particles themselves such as one or more fillers, the density of the IP shall be taken as the density of the particle composition. Similarly if the SP has other items in the composition, the density of the SP will be taken as the density of that composition.

By a "part" is meant any shaped object. It may be a final shape that is useful directly, or a "preform", "blank" or "standard shape" that will be cut and/or machined into its final shape.

The ratio of the longest dimension to the shortest dimension of the SP pieces or the voids is measured on a number of either of these items, and the results averaged to get the ratio. For example, if the SP pieces are fibers the lengths and diameters of each of the fibers are measured. The length of each fiber is then divided by the fiber's diameter (assuming a circular cross section), and the results of a number of these ratios is averaged.

The porous IP part is made by mixing particles of the IP, typically a fine powder, with elongated particles of the SP. The mixing should preferably be done so as to obtain a uniform dispersion of the SP in the IP. This mixture is then subjected to pressure in a mold to shape it. At this point, pressure may be the only "force" for consolidation to a solid part, but some heat may also be used. At least at the beginning of the consolidation, the temperature should not exceed the decomposition point of the SP, in order to "imprint" the volume taken up by the SP in the internal part of the IP part. However, once the IP part shape has been set, if desired the decomposition temperature of the SP can be exceeded. One probably would often not want to exceed the decomposition temperature of the SP while the part was in mold because excessive pressure could be generated and/or the mold may be fouled by the SP decomposition product(s). After the part is formed it may be removed from the mold and heated (sintered). The sintering can not only remove the SP by pyrolysis and/or chemical reaction (oxidation in air for instance), but may also assist in densifying the final part. Subject to the point made in this paragraph, conditions for forming the part from the IP particulate can be the same as is normally used and/or recommended for the IP.

The SP pieces are essentially the "templates" for the size and shape of the voids to be formed in the IP. They may be of any elongated shape meeting the requirements of the SP size and shape. However a preferred form for the SP is a fiber, especially a fiber with a circular cross section, in other words the latter will form a void in the shape of a tube with a (more or less) circular cross section. In this instance, as mentioned above, the ratio of the longest dimension to the shortest dimension for both the SP and the void will be the length of the fiber divided by its diameter. One reason fibers are preferred is that they may be readily formed from many thermoplastics, and in many instances the fibers are relatively inexpensive.

The SP is a minimum of about 0.2 volume percent, preferably 0.5 volume percent and more preferably about 1.0 volume percent of the total volume of the SP and IP. The maximum amount of SP is about 10 volume percent, preferably about 7 volume percent, preferably about 5 volume percent, and very preferably about 3 volume percent of the total volume of the SP and IP present. Any maximum and minimum volume percents may be combined to form a preferred volume percent range.

In the present porous IPs, the fibers, and hence the pores, are preferably not parallel, more preferably not substantially parallel, to one another because the fibers are typically mixed with the particulate IP in a random fashion before consolidation. By "substantially parallel" is meant that the long axis of any given random pore is at least a 10° angle to any other randomly chosen pore. Put another way, the average angle between the longitudinal axes of any two pores is at least 10°. Note however this does not mean that there is no general alignment of the fibers (and hence pores), even though not even substantially parallel, the fibers and pores may have a preferred orientation.

Preferably the present parts are at least about 1 mm thick in their smallest cross sectional dimension, more preferably at least about 2 mm thick.

Second polymers suitable use in the present invention include: polypropylene, polyethylene, acrylic polymer, cellulose acetate, and cellulosic polymers, for example. Other suitable polymers may be known to one of ordinary skill in the polymer arts, and such polymers would not be outside of the scope of the present invention. There is a class of polymer made to readily depolymerize or pyrolyze cleanly at a given temperature, for instance some polymers made for masking applications in electronics. These polymers are also useful herein. These polymers made to decompose are often (meth) acrylates or copolymers of (meth)acrylates with other monomers. Of course the particular SPs useful with any particular IP will depend on the decomposition temperature of the particular IP used. The pyrolysis or reaction temperature of the SP should of course be just below or preferably significantly below the IP decomposition temperature. Whatever SP is used and whether it is a simple thermal degradation or a reaction (for example oxidation), the less residue from the removal of the SP that remains in the IP part, the better.

A preferred type of IP is a polyimide. Polyimides typically are derived from tetracarboxylic acids (or their derivatives such as dianhydrides) and diamines such as pyromellitic dianhydride (PMDA) and diaminodiphenyl ether (ODA) and 3,3',4,4'-biphenyltetracarboxylic dianhydride (BPDA) and ODA. A typical example of a polyimide prepared by a solution imidization process is a rigid, aromatic polyimide composition having the recurring unit:

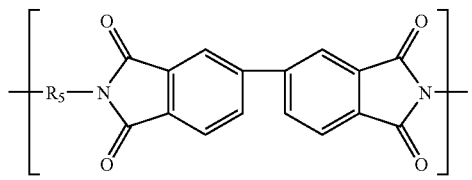

wherein $R_5$ is greater than about 60 to about 85 mole percent p-phenylene diamine (PPD) units and about 15 to less than about 40 mole percent m-phenylene diamine (MPD) units.

The tetracarboxylic acids preferably employed in the practice of the invention, or those from which derivatives useful in the practice of this invention can be prepared, are those having the general formula:

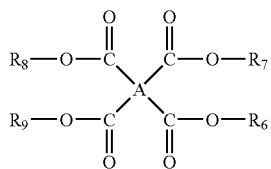

wherein A is a tetravalent organic group and $R_6$ to $R_9$, inclusive, comprise hydrogen or a lower alkyl, and preferably methyl, ethyl, or propyl. The tetravalent organic group A preferably has one of the following structures:

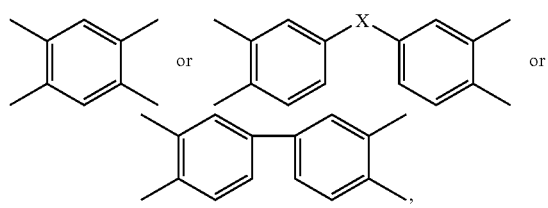

wherein X comprises at least one of

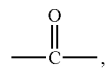

—O—, —S—, —SO$_2$—, —CH$_2$—, —CH$_2$CH$_2$—, and

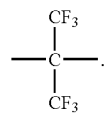

As the aromatic tetracarboxylic acid component, there can be mentioned aromatic tetracarboxylic acids, acid anhydrides thereof, salts thereof and esters thereof. Examples of the aromatic tetracarboxylic acids include 3,3',4,4'-biphenyltetracarboxylic acid, 2,3,3',4'-biphenyltetracarboxylic acid, pyromellitic acid, 3,3',4,4'-benzophenonetetracarboxylic acid, 2,2-bis(3,4-dicarboxyphenyl)propane, bis(3,4-dicarboxyphenyl)methane, bis(3,4-dicarboxyphenyl)ether, bis(3,4-dicarboxyphenyl)thioether, bis(3,4-dicarboxyphenyl) phosphine, 2,2-bis(3',4'-dicarboxyphenyl) hexafluoropropane, and bis(3,4-dicarboxyphenyl)sulfone.

These aromatic tetracarboxylic acids can be employed singly or in combination. Preferred is an aromatic tetracarboxylic dianhydride, and particularly preferred are 3,3',4,4'-biphenyltetracarboxylic dianhydride, pyromellitic dianhydride, 3,3',4,4'-benzophenonetetracarboxylic dianhydride, and mixtures thereof.

As an organic aromatic diamine, use is preferably made of one or more aromatic and/or heterocyclic diamines, which are themselves known to the art. Such aromatic diamines can be represented by the structure: H$_2$N—R$_{10}$—NH$_2$, wherein R$_{10}$ is an aromatic group containing up to 16 carbon atoms and, optionally, containing up to one heteroatom in the ring, the heteroatom comprising —N—, —O—, or —S—. Also included herein are those R$_{10}$ groups wherein R$_{10}$ is a diphenylene group or a diphenylmethane group. Representative of such diamines are 2,6-diaminopyridine, 3,5-diaminopyridine, m-phenylenediamine, p-phenylene diamine, p,p'-methylene dianiline, 2,6-diaminotoluene, and 2,4-diaminotoluene.

Other examples of the aromatic diamine components, which are merely illustrative, include benzene diamines such as 1,4-diaminobenzene, 1,3-diaminobenzene, and 1,2-diaminobenzene; diphenyl(thio)ether diamines such as 4,4'-diaminodiphenylether, 3,4'-diaminodiphenylether, 3,3'-diaminodiphenylether, and 4,4'-diaminodiphenylthioether; benzophenone diamines such as 3,3'-diaminobenzophenone and 4,4'-diaminobenzophenone; diphenylphosphine diamines such as 3,3'-diaminodiphenylphosphine and 4,4'-diaminodiphenylphosphine; diphenylalkylene diamines such as 3,3'-diaminodiphenylmethane, 4,4'-diaminodiphenylmethane, 3,3'-diaminodiphenylpropane, and 4,4'-diaminodiphenylpropane; diphenylsulfide diamines such as 3,3'-diaminodiphenylsulfide and 4,4'-diaminodiphenylsulfide; diphenylsulfone diamines such as 3,3'-diaminodiphenylsulfone and 4,4'-diaminodiphenylsulfone; and benzidines such as benzidine and 3,3'-dimethylbenzidine.

Other useful diamines have at least one non-heteroatom containing aromatic rings or at least two aromatic rings bridged by a functional group. These aromatic diamines can be employed singly or in combination. Preferably employed as the aromatic diamine component are 1,4-diaminobenzene, 1,3-diaminobenzene, 4,4'-diaminodiphenylether, and mixtures thereof.

The porous IP may contain materials other than the IP itself. It may contain materials that IP compositions normally contain such as filler(s), reinforcing agent(s), pigment(s), and lubricant(s), etc. These may be present when the IP is formed, so that a particulate containing the one or more of these materials is produced. This particulate containing the other material(s) in addition to the IP is used in the present process. Alternatively the other materials to be added to the IP may be mixed in with the IP and SP in the present process and the whole consolidated together. A combination of these two methods may be used to add different materials to the composition. Of course any other materials meant to be in the final composition should be thermally stable up to the temperature at which the SP is removed from the part.

The void containing (porous) parts described are particularly useful wherein they are heated rapidly (often much) above the boiling point of water after having been exposed to water at lower (ambient) temperature which allowed them to imbibe water. Their tendency to blister (form uncontrolled voids) under these conditions is greatly reduced. It is believed that the elongated pores of the present parts form pathways which allows the escape of water (vapor) which may form when "wet" parts are heated rapidly.

This makes them useful, for instance, in parts used in (including parts adjacent to) jet engines, internal combustion engines, turbochargers, electrical and electronic parts subject to high temperatures (either internally or externally generated). Even though these parts contain porosity, the controlled nature of the porosity and its relatively low level gives parts whose physical properties such as strength and toughness which usually are not greatly affected by the porosity. Of course jet engines, internal combustion engines, turbochargers, and electrical and electronic parts subject to high temperatures (either internally or externally generated) may comprise a part comprising the porous IP described herein.

The shape of the voids, and their dimensions, may be measured and "visualized" by using X-ray microtomography, as generally described in A. Susov and D. van Dyck, *Desktop X-Ray Microscopy and Microtomography*, Journal of Microscopy, vol. 191, p. 151-158 (1998), which is hereby incorporated by reference. FIG. 1, which is a cross section of a part made as described in Example 12, shows the voids made after the polypropylene fibers were "burned off".

All patents and other references described in the examples are hereby incorporated by reference, as if fully set forth herein.

In the Examples, certain abbreviations are used. They are:
BPDA—3,3',4,4'-biphenyltetracarboxylic dianhydride
MPD—m-phenylenediamine
PPD—p-phenylenediamine Example 1

Particles of a polyimide resin comprising 50 wt % of a polyimide based on BPDA, PPD, and MPD (with a 70/30 weight ratio of PPD/MPD) and 50 wt % of synthetic graphite were prepared according to the method described in U.S. Pat. No. 5,886,129 (e.g., Example 7) and milled through a 20 mesh screen.

Example 2

Polypropylene fibers (~3-4 denier) were cut to lengths from about 0.5 mm to about 3 mm. These cut fibers, at 1 wt % loading, were dispersed into resin from Example 1 by combining fiber and resin in a Waring-type blender and blended at high speed for 15 sec. Test samples in the form of microtensile bars were molded according to the method described in U.S. Pat. No. 4,360,626 (esp. column 2, lines 54-60). Specific gravity was determined. Tensile strength and elongation were determined according to ASTM D 638-03, using an 1122 model Instron®. The crosshead speed was 0.2 in/sec (5.1 mm/sec) and an extensometer was attached to the bar during testing to measure elongation. The results are reported in Table 1.

Examples 3 and 4

Test samples were prepared containing 2 and 4 wt % polypropylene fiber according to the method of Example 2. Physical testing results are reported in Table 1.

Comparative Example A

Test samples were prepared from resin described in Example 1 with 2 wt % of polypropylene fiber. Fiber and resin mixing were accomplished by roll mixing overnight, not in a blender. Physical testing results are reported in Table 1.

Comparative Examples B and C

Test samples were prepared from resin described in Example 1, according to the method in Example 2 but without the polypropylene fiber, either with or without treatment in the blender. Physical testing results are reported in Table 1.

In Table 1 Specific Gravity is gm/mL, Tensile Strength to break is MPa, and Elongation is percent.

TABLE 1

| Example | Fiber wt % | Blended | Spec Grav | Tens Str | Elongation |
|---------|-----------|---------|-----------|----------|------------|
| 2 | 1 | Yes | 1.6559 | 91.0 | 5.5 |
| 3 | 2 | Yes | 1.6264 | 76.5 | 3.1 |
| 4 | 4 | Yes | 1.5600 | 71.7 | 2.3 |
| A | 2 | No | 1.6220 | 56.5 | 1.1 |
| B | 0 | No | 1.6925 | 97.9 | 6.5 |
| C | 0 | Yes | 1.6852 | 97.9 | 5.4 |

Although there is some decrease in physical properties when porosity is present, especially when the fiber is not well dispersed, the porosity does not lead to very large decreases in these properties, especially at the 1% level.

Example 5

Samples from the preceding examples were conditioned for a thermal shock test by soaking in 95° C. liquid water for 14 days. The samples were then thermally shocked by placing them in an oven preheated to 325° C., 350° C., 375° C., or 400° C. for 1 h. After the 1 h heat soak, the samples were removed from the oven, allowed to cool and then examined for the presence of blisters. The presence of blisters as noted under "Observations" in Table 2, below, indicate which samples failed the test, and the temperature at which the blisters first appear. The test results are reported in Table 2.

TABLE 2

| Example | 325° C. Observations | 350° C. Observations | 375° C. Observations | 400° C. Observations |
|---|---|---|---|---|
| 2 | None | None | None | None |
| 3 | None | None | None | None |
| 4 | None | None | None | None |
| A | Small blisters | Small blisters | Small blisters | Small blisters |
| B | None | Small blisters | Blistered | Blistered |
| C | Blistered | Blistered | Blistered | Blistered |

Examples 6-11

Other samples were prepared using the method described in Example 2 using different fibers at 4 wt % fiber loading. These fibers, which were nominally 3 mm long, were obtained from Engineered Fibers Technology, LLC (Shelton, Conn. 06484, U.S.A.). In order to be considered suitable for producing controlled porosity in polyimide parts, it must be possible to mold the parts without blistering during the sintering step. The results for molding of samples with these fibers are reported in Table 3. These results possibly could be changed (improved) by altering the heating cycle when the fibers are "burned off", especially by heating more slowly. These Examples illustrate that a variety of fibers, and of different diameters, may be used to form the pores.

TABLE 3

| Example | Fiber Material | Denier* | Result |
|---|---|---|---|
| 6 | Polyethylene | 4 | No Blisters |
| 7 | Cellulose Acetate | 1.5 | No Blisters |
| 8 | Polyvinylalcohol | 0.3 | Blistered |
| 9 | Lyocell ® Tencel (cellulosic) | 1.5 | No Blisters |
| 10 | Acrylic | 0.3 | No Blisters |
| 11 | Acrylic | 1.5 | Blistered |

*Denier is the number of grams per 9000 meters of a single filament of fiber.

Example 12

By a method similar to that in Example 2, 1.2 weight percent of polypropylene fiber was blended with the polyimide. The mixture was placed in a mold which was placed in a hydraulic press and compressed at 276 MPa. These parts were sintered under nitrogen using a heating cycle of ambient temperature to 400° C. over a period of 59 hours, and then held at 400° C. for 3 hours, and then cooled. The parts were then machined into final parts. One of these parts was then subjected to X-Ray Tomography, the result of which is shown in FIG. 1, which is from a video of that tomography. The "lines" visible in the Figure are the pores formed by pyrolysis of the polypropylene fiber and are voids in the polyimide (which was "subtracted out" from the tomograph). A scale marker is shown in the Figure. This is only a portion of the part, the polyimide ("solid") portion of which is not shown, but in FIG. 1 extends as in the form of a rectangle to the overall periphery of the voids shown. Note that the fibers appear to have a preferred orientation, but are not substantially parallel.

What is claimed is:

1. A part comprising an infusible polymer, wherein the infusible polymer is selected from the group consisting of polyimides, poly(p-phenylenes), and polymers composed mostly or all of repeat groups of the formula

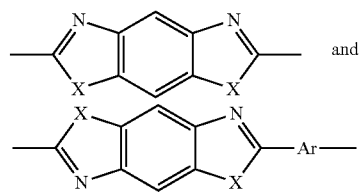

wherein X is NH, N-Phenyl, O (oxygen) or S (sulfur), and Ar is p-phenylene, 4,4'-biphenylene or 1,4-naphthylylene; and wherein said polymer comprises voids present in a range of from about 0.2 to 5 volume percent, wherein each void is elongated in the shape of a tube with a circular cross section, wherein a ratio of a longest dimension of said voids to a smallest dimension of said voids is at least 10:1.

2. The part of claim 1, wherein the part is at least about 2 mm thick in its smallest cross sectional dimension.

3. The part of claim 1, wherein the voids are not substantially parallel.

4. The part of claim 1, wherein the infusible polymer further comprises at least one filler, at least one reinforcing agent, at least one pigment, at least one lubricant, or a combination thereof.

5. A jet engine, internal combustion engine, turbocharger, electrical part, or electronics part comprising the part of claim 1.

* * * * *